No. 839,803. PATENTED JAN. 1, 1907.
A. AMSLER.
MEANS FOR INDICATING RELATIVE MOVEMENT OF PARTS OF ROTATING SHAFTS.
APPLICATION FILED MAR. 23, 1906.
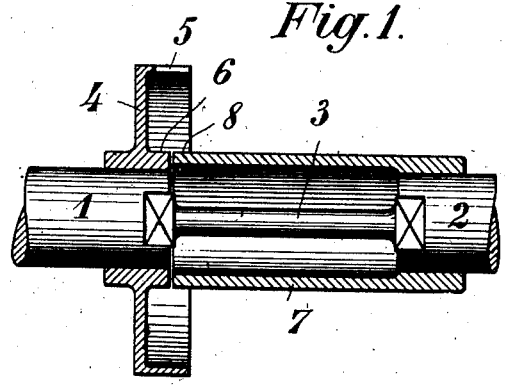
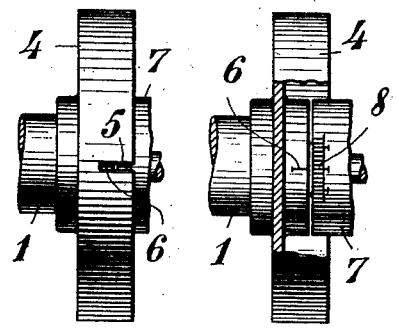
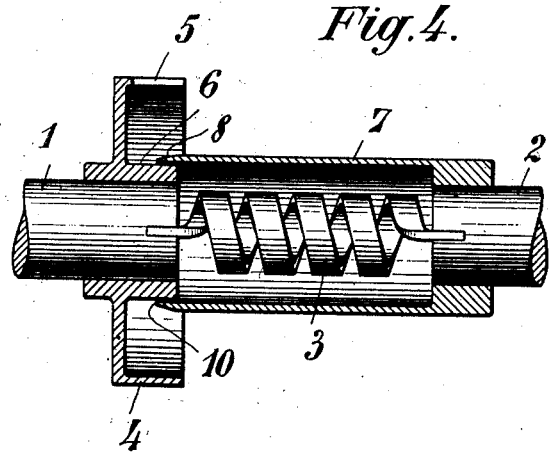
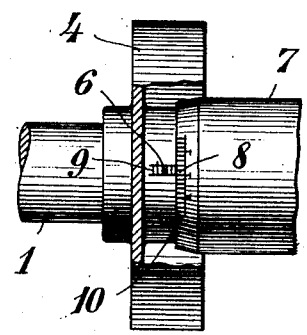
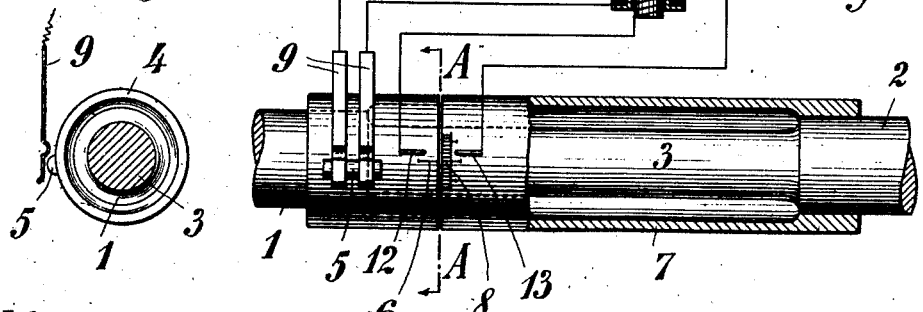
Witnesses:
Inventor:
Alfred Amsler.

UNITED STATES PATENT OFFICE.

ALFRED AMSLER, OF SCHAFFHAUSEN, SWITZERLAND.

MEANS FOR INDICATING RELATIVE MOVEMENT OF PARTS OF ROTATING SHAFTS.

No. 839,803.   Specification of Letters Patent.   Patented Jan. 1, 1907.

Application filed March 23, 1906. Serial No. 307,659.

*To all whom it may concern:*

Be it known that I, ALFRED AMSLER, a citizen of the Republic of Switzerland, residing at Schaffhausen, Switzerland, have invented a new and useful Improved Means for Indicating the Relative Movement of Parts of Rotating Shafts, of which the following is a specification.

This invention relates to means for measuring relative alterations in angular positions and in length of members or portions thereof in motion—for instance, for measuring the relative turning and alteration of distance between two rotating shafts or of two portions of one and the same rotating shaft.

According to this invention a screen having a perforation such as a slit or hole is periodically brought to appear before the eye with the speed of the observation-point so that the impression is produced as if the observation-point was at rest, thus rendering it possible to read the result of the measurement through the perforation, or, for a like purpose, instead of a screen with a perforation the point of observation is periodically illuminated for a period of time that is very small in proportion to the speed of rotation of the point of observation.

Constructional examples of means according to this invention for carrying out the improved method are shown in the illustrative drawings accompanying my provisional specification.

Figure 1 of the drawings is a view, partly in elevation and partly in longitudinal section, showing one construction. Fig. 2 shows a part of the device illustrated in Fig. 1 in elevation, and Fig. 3 shows the same part partly in section. Fig. 4 is a similar view to Fig. 1, showing another construction; and Fig. 5 shows a part of the device illustrated in Fig. 4, partly in elevation and partly in section. Fig. 6 is a view, partly in elevation, partly in section, and partly diagrammatic, showing a further construction. Fig. 7 is a transverse section corresponding to the line A A of Fig. 6.

Referring to the construction shown in Figs. 1 to 3, 1 and 2, Fig. 1, are two coaxial shaft ends rigidly connected to each other by a torsionally-elastic round rod 3, that is thin in proportion to the diameter of the shafts. On the shaft end 1 is fixedly mounted a round disk 4, hereinafter called a "screen," having a rim projecting at right angles thereto. This rim is arranged concentrically to the axis of rotation of the shaft 1, and it is formed with a slot 5, extending in the direction of said axis and open at one end, Figs. 1 and 2. In a radial direction opposite to the slot 5 and lying in the same direction as said slot an indicating-line 6 is marked on the boss of the screen. On the shaft end 2 there is fastened a sleeve 7, one end of which extends nearly to the end of the boss of the screen 4, that is provided with the indicating-line 6 and which is located opposite to the sleeve 7, which at this end is marked with a scale 8.

In explaining the mode of action of the before described and illustrated construction of the subject-matter of this invention the following remarks may be made: As is well known, when a disk or a band provided with a slit is moved rapidly in one direction or the other before the eye an observer receives at the moment when the slot comes before the eye the instantaneous visual impression of an image that is behind the screen no matter whether the image be at rest or in motion. The finer the slit and the stronger the illumination of the image the clearer the latter appears.

With the device shown in Figs. 1 to 3 an observer keeping his eye above the rim of the screen 4 sees through the slot 5 both the indicating-line 6 and the scale 8 that lies opposite the latter. If the shaft 1, and therefore the screen 4, turns slowly, the line 6 and the scale 8 appear to the eye at each revolution for a moment. If, however, the shaft 1 turns rapidly, the appearing of the slit can no longer be perceived, the successive visual impressions uniting to form a single image, and the eye sees the line 6 and the scale 8 constantly, just as if the same were at rest. If now a force is transmitted from the shaft 1 to the shaft 2 through the torsionally-elastic rod 3, the rod 3 is twisted, yielding elastically in proportion to the strength of the torsional force transmitted. The scale 8 is thus displaced in relation to the indicating-line 6 an amount according to the extent which the rod 3 has been twisted. During this time an observer can read off the position of the indicating-line 6 exactly with reference to the scale 8 and find out from the reading the relative torsion of the shafts 1 and 2 or the respective force transmitted from the shaft 1 to the shaft 2.

The constructional example shown in Figs. 4 and 5 is substantially similar to that shown in Figs. 1 to 3, corresponding parts being similarly marked in each case. Instead of the round rod 3, however, a spiral spring 3 is provided as a connection between the shafts 1 and 2, which not only permits of an elastic twisting, but also of an elastic alteration in length in order to enable both the force of transmission and the longitudinal displacement, and consequently the thrusting force between the shafts 1 and 2, to be measured. In order to facilitate the measurement of the longitudinal displacement, a scale 9 is transversely marked along the indicating-line 6 of the screen, the outer rim 10 of the sleeve 7 acting as the indicating-line for same. The statements with reference to the slit 5, the line 6, and the scale 8 of the device shown in Figs. 1 to 3 also hold good for the device under notice—that is to say, the force of transmission is indicated by the line 6 on the scale 8, while the thrusting force is indicated by the rim 10 of the sleeve 7 on the scale 9, and both positions can be simultaneously observed through the slit 5. This construction is adapted, for instance, to the simultaneous measurement of the turning force given off by a steam-turbine to a ship's screw and the reaction or thrust of the ship's screw.

In the case of the two previously-described arrangements, in which a screen with slit is employed for carrying out the improved method, the scale is always seen, no matter at what part of the circumference one looks toward the scale. On the other hand, one sees in a given position of the eye the moving object in the definite phase exactly corresponding to the position of the eye. Should, therefore, the force of transmission alter periodically during a revolution, one could follow the whole period by letting the eye travel round the rim of the screen. The means for carrying out the improved method can, however, be so arranged that no special elastic member is interposed between two shafts; but between two lengths of one and the same shaft a part of reduced diameter is provided. One construction of such an arrangement is shown in Figs. 6 and 7, the two portions of shaft being marked 1 and 2 and the reduced intermediate portion 3. On the shaft portion 1 is mounted a sleeve 4, and on the portion 2 a sleeve 7. The adjacent rims of these sleeves extend to near each other. The sleeve 4 is provided on its periphery with an indicating-line 6 and the sleeve 7 with a scale 9, said line and scale being located opposite to each other on said rims. The reading off of the relative torsion of the transverse sections of the shaft lengths 1 and 2 could with such arrangement be effected, as in the former examples, by means of a screen provided with a slit. However, in the construction illustrated an arrangement is provided by which the reading off can be done without the employment of a screen—namely, by the lightning-like illumination of the point of observation in cases where the latter is situated in a dark place or in order to make the measurements by night. Such a lightning-like illumination can be produced by causing an electric induction-spark to spring over spontaneously or periodically at the point of observation. For the latter purpose on the sleeve 4 a somewhat long projection 5 is provided, on which two contact-springs 9 are arranged. The springs are carried in any suitable way outside the sleeve 4, one spring being connected with a battery 10 and the other with the primary winding of an induction-coil 11, which in turn is in connection with the battery. The secondary winding of the coil 11 is connected with two sparking terminals 12 and 13, arranged opposite each other at the point of observation. At each revolution of the shaft 1 2 3 the projection 5 will come into contact with the two springs 9, and thereby close the electric circuit proceeding from the battery 10. On the projection 5 leaving the springs 9, the circuit is again broken and there arises in the coil 11 an induction-current that produces a spark between the two points 12 and 13. This spark springs across at the precise moment when the line 6 coincides with the point 12, which in the case of rapid rotation of the shaft produces in the eye of the observer the impression as if the illuminated point of observation were at rest, so that the result of the measurement can be accurately read off.

With the above described and illustrated devices the relative movement of machine parts in motion can be made visible and be measured, and therefore, as described and illustrated by way of example, the relative torsion of two shafts or the relative displacement or also simultaneously the relative torsion and longitudinal displacement of these parts. In like manner the method can be applied advantageously to the measurement of relative movements in reciprocating members and mechanisms or to the measurement and observation of relative movements of parts running separate from one another—e. g., the engagement of toothed wheels and the like. By means of the devices an observer may see, for instance, the relative vibration of two shafts and ascertain the amount of such vibration from the scale.

The speed at which the apparatus revolves is a matter of little importance, as the appearance presented remains constant even when the apparatus makes thousands of revolutions per minute. The apparatus is therefore very suitable for the measurement of the power given off by steam-turbines and other fast-running motors or the power absorbed by centrifugal pumps or ventilators.

As the scale of the rotating apparatus can be read off just as accurately as a stationary scale—that is, as accurately as desired—small elastic torsion of the measuring member 3 suffices for exact observation. Neither does any disturbing friction occur in the arrangement of the measuring member.

A means of graphically representing the measuring results obtained with the devices described is by fixing by photography the image which would be seen by direct observation with the eye.

Having now particularly described and ascertained the nature of the said invention and in what manner the same is to be performed, I declare that what I claim is—

1. In means for observing the relative movement of simultaneously-moving adjacent parts, the combination with one part having a scale thereon; of an adjacent part having a mark thereon and means governed by the movement of the parts controlling the visibility of the mark and scale.

2. In means for observing the relative movement of simultaneously-moving adjacent parts, the combination with one part having a scale thereon; of an adjacent part having a graduated mark thereon and means governed by the movement of the parts controlling the visibility of the mark and scale.

3. Means for observing the relative movement of similarly and simultaneously moving parts, comprising a mark carried by one of the parts, a scale adjacent the mark carried by the other part, and a screen carried by one of the parts having a view-aperture opposite the scale and mark, substantially as described.

4. Means for observing the relative movement of similarly and simultaneously moving parts comprising a mark carried by one of the parts and a scale adjacent the mark carried by the other part, a screen comprising a flanged disk having a view-opening in its flange opposite the scale and mark, substantially as described.

5. The combination with the adjacent ends of two shafts, of a connection between the ends capable of torsion, a mark carried by one shaft end and a peripheral scale adjacent the mark carried by the other shaft end, and a screen comprising a flanged disk having a view-aperture in its flange opposite the scale and mark, substantially as described.

6. The combination with the adjacent ends of two shafts, of a connection between said ends capable of simultaneous torsion and alteration of length, a graduated mark carried by one of the shaft ends and a peripheral scale adjacent the mark carried by the other shaft end, and a screen secured to one of the shaft ends comprising a flanged disk having a view-aperture opposite the mark and scale whereby both relative angular and axial displacements are indicated, substantially as described.

7. The combination with the adjacent ends of two shafts, of a torsion-spring connecting them, a flanged disk secured to one of the shaft ends having a slot in its periphery parallel with its axis and a graduated mark on its hub, and a sleeve secured to the other shaft end extending over the mark and provided with a peripheral scale at its free edge, said slot opposite the mark and disk, whereby both the relative axial and peripheral displacements of the shaft ends may be viewed through the slot during their rotation, substantially as described.

In testimony whereof I have signed my name to this specification in the presence of two subscribing witnesses.

ALFRED AMSLER.

Witnesses:
  JEAN SCHOOD,
  A. LIEBERKNECHT.